United States Patent

Morawa et al.

[11] Patent Number: 5,411,228
[45] Date of Patent: May 2, 1995

[54] CABLE CLIP

[75] Inventors: Joseph E. Morawa, Chicago; Bjarne Frederiksen, Lombard; George Z. Lannert, Evanston; Mohammad Masghati, Addison, all of Ill.

[73] Assignee: Illinois Tool Works Inc., Glenview, Ill.

[21] Appl. No.: 167,158

[22] Filed: Dec. 16, 1993

[51] Int. Cl.⁶ .................................................. F16L 3/08
[52] U.S. Cl. .................................. 248/74.5; 174/135; 174/154; 248/71; 411/437; 411/970; 411/999
[58] Field of Search ........................ 248/65, 74.5, 74.1, 248/71, 73, 67.5, 547; 174/158 R, 168, 135, 40 CC, 141 R, 154, 161 F, 158 F; 411/970, 999, 533, 354

[56] References Cited

U.S. PATENT DOCUMENTS

| | | | |
|---|---|---|---|
| 2,570,957 | 10/1951 | Lee | 248/71 |
| 2,681,196 | 6/1954 | Lind | 248/71 |
| 3,430,903 | 3/1969 | Mathes | 248/68 |
| 3,951,367 | 4/1976 | Hagelberg | 248/71 |
| 4,127,250 | 11/1978 | Swick | 248/71 |
| 4,582,288 | 4/1986 | Ruehl | 248/547 |
| 4,588,152 | 5/1986 | Ruehl et al. | 248/745 X |
| 4,903,920 | 2/1990 | Merritt | 248/71 |
| 4,903,921 | 2/1990 | Logsdon | 248/74.5 |
| 5,040,752 | 8/1991 | Morrison | 248/71 |
| 5,054,741 | 10/1991 | Ismert | 248/74.5 |
| 5,192,040 | 3/1993 | Washizu | 248/74.5 |
| 5,302,070 | 4/1994 | Kameyama et al. | 411/437 |

FOREIGN PATENT DOCUMENTS

| | | | |
|---|---|---|---|
| 0836387 | 3/1970 | Canada | 248/74.5 |
| 1077248 | 3/1960 | Germany | |
| 2435995 | 12/1976 | Germany | |

Primary Examiner—Ramon O. Ramirez
Attorney, Agent, or Firm—Schwartz & Weinrieb

[57] ABSTRACT

A cable clip for retaining coaxial cables and the like against a mounting surface is provided which includes fastener retaining means for holding a fastening device in place prior to user installation. In one embodiment, the fastener retaining means includes a plurality of segmented arcuate-shaped wall portions which are tapered inwardly so as to resiliently grip the fastening device. In a second embodiment, the fastening retaining means includes a plurality of radially extending tabs disposed on the inner surface of a cylindrically-shaped fastener hole for frictional engagement with the fastener device with a retention fit.

22 Claims, 2 Drawing Sheets

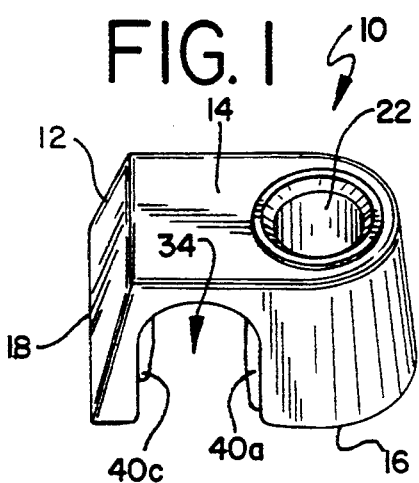
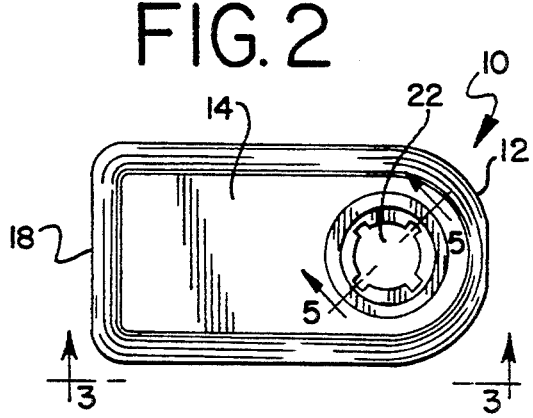
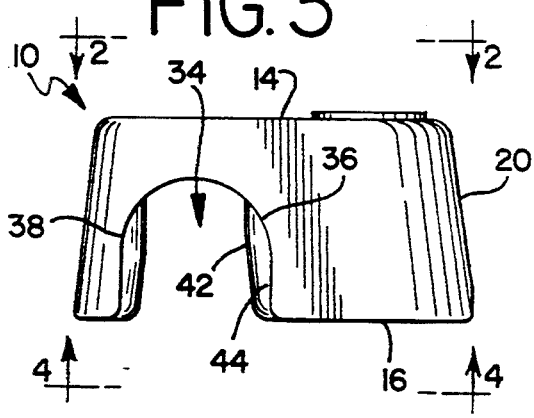
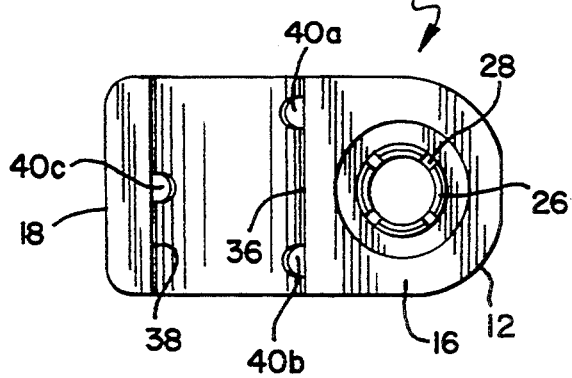
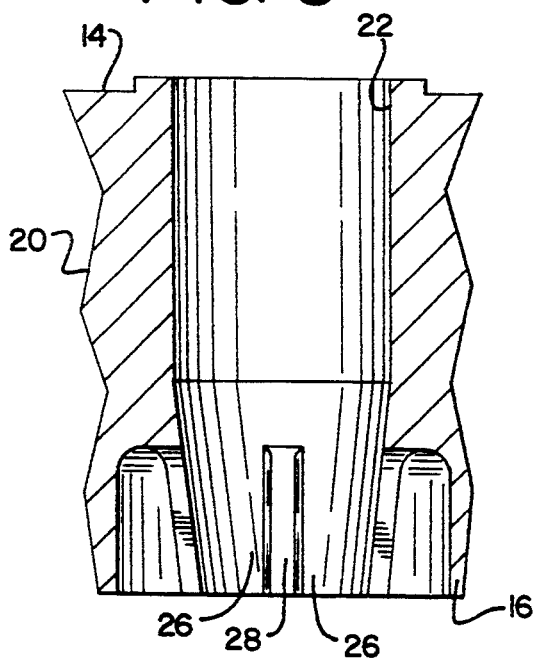
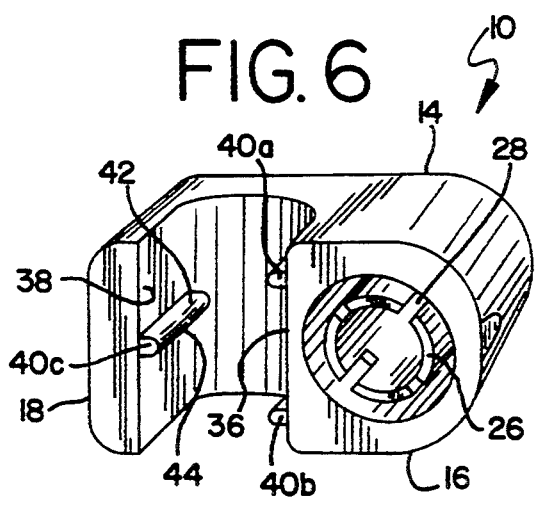

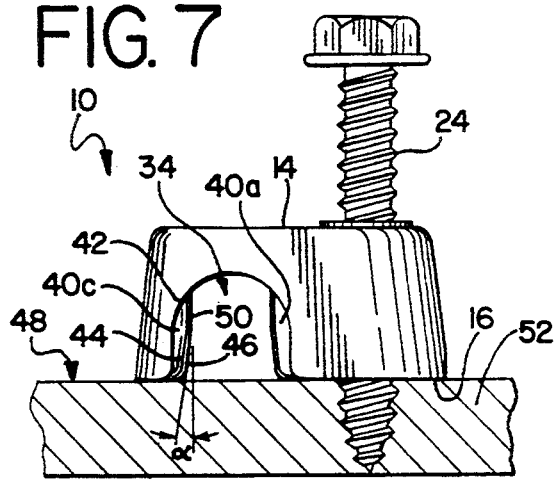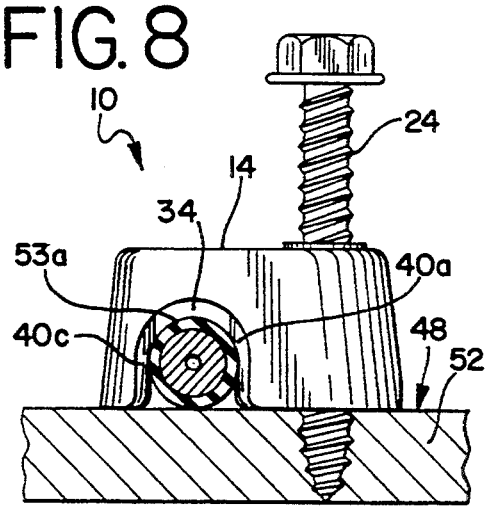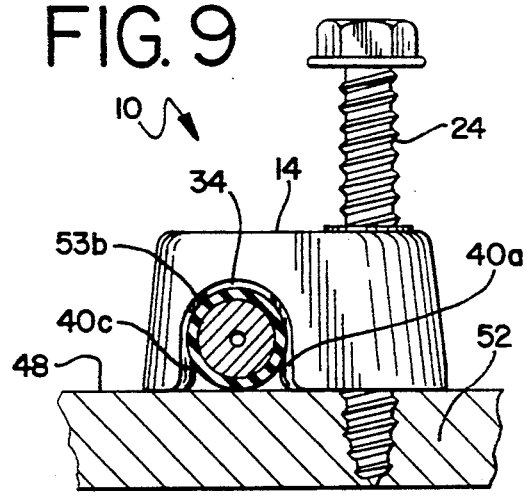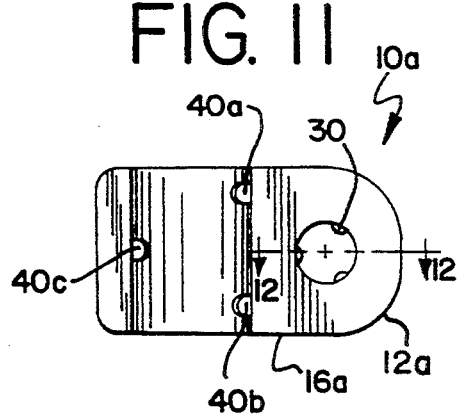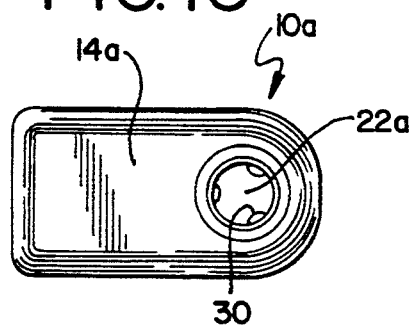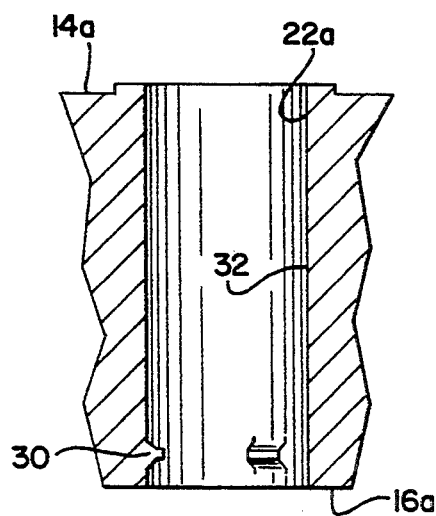

CABLE CLIP

BACKGROUND OF THE INVENTION

1. Field of the Invention

This invention relates generally to wire clamping clips and more particularly, it relates to an improved cable clip for retaining coaxial cables and the like against a mounting surface which includes fastener retainer means for holding a fastening device in place relative to the clip prior to installation.

2. Description of the Prior Art

As is generally well-known in the art, there are many types of clips for retaining wires, cables and the like against a mounting surface. Typically, such clips are used to hold an insulated electrical cable to a building structure such as a floor, wall or roof. The clip is generally installed by inserting a nail, screw or similar fastening device through a hole in the clip and then into the mounting surface. Further, it is known that the cables used are generally of different sizes in diameter which require different size clips.

In order to improve the rapidity and the ease of installing the cable clips, it would be desirable to have the fastening device already retained in place in the clamping clip prior to user installation. In particular, this would facilitate the shipping and storage of the cable clips with the fasteners when not in use so as to prevent them from being lost. Also, it would be desirable to have a cable clip which is of a construction so as to accommodate different sizes of cables.

A prior art search directed to the subject matter of this application in the U.S. Patent and Trademark Office revealed German Patent Nos. 1,077,284 and 2,435,995, and the following U.S. Pat. Nos:

2,570,957
4,582,288
2,681,196
4,588,152
3,430,903
4,903,920
3,951,367
5,040,752
4,127,250
5,192,040

In U.S. Pat. No. 2,570,957 to E. W. Lee issued on Oct. 9, 1951, there is disclosed a fastening device which includes an apron 28 which remote from its junction with a leg 20 which is equipped with a tapered tongue 30. When the apron 28 which is bent inwardly to lie adjacent the leg 20, the tongue 30 will enter the portion of the groove 16 which lies along the leg 20 so as to engage the shank of the nail and hold the same in assembled position within the clip.

In German Patent No. 2,435,995 published Feb. 12, 1976, there is disclosed a C-shaped portion 1 and a fixing lug portion 2. The lower part of the fixing lug portion includes a flexible tongue 7 having an oblique attitude so as to grip a screw 10 in the hole 9 and prevents it from being lost.

In U.S. Pat. No. 3,951,367 to Anders Hagelberg issued on Apr. 20, 1976, there is taught a fastener which includes a portion 1 having an inner pleated surface (FIG. 1) so as to make possible the adaptation to different dimensions of a cable, tube or similar element. In another embodiment in FIGS. 7 and 8, there is shown a sheet metal clip which includes parts 35 and 36 connected together in a V-shaped arrangement for holding a screw 38. The threads of the screw are engageable with the edges of the stamped-out portions 37 formed on the parts 35 and 36.

In U.S. Pat. No. 4,588,152 to William E. Ruehl et al. issued on May 13, 1986, and assigned to the same assignee as the present invention, there is taught a wire clamping clip 10 comprised of a base member 12, a bushing 14 and a hardened pin 16. The base member 12 is formed of a body 18 having a wire receiving recess 24 disposed between side walls 26 and 28. In order to accommodate slight variations in the diameter size of a cable, a rib 25 is provided on the side wall 28 and a rib 27 is provided on the side wall 26. As can best be seen from FIG. 5, the ribs 25 and 27 are tapered inwardly from adjacent the working surface 20 to the top of the bullet-shaped slot 34 so as to retain the cable C therein. However, as the cables of larger diameters are inserted into the recess 24, they tend to become more distorted so as to cause possible physical damage or destruction thereto.

In U.S. Pat. No. 4,127,250 to Edwin G. Swick issued on Nov. 28, 1978, and assigned to the same assignee as in the present invention, there is disclosed a wire clamping device which includes a block member 12 having a pair of pins 34 preassembled therein and a recess 22 in its bottommost, workpiece engaging surface 16. Protrusions 24 form a restricted mouth region for the recess 22 so as to frictionally engage the wire.

In U.S. Pat. No. 4,582,288 to William E. Ruehl issued on Apr. 15, 1986, and assigned to the same assignee as in the present invention, there is disclosed a wire routing clip assembly which includes a block member 12 having a pair of cylindroconical bores 14 with each being adapted to receive a pointed pin 16 therethrough. Each pin has a frustroconical end with an included angle which is less than the included angle of the frustroconical portion of the cylindroconical bores. Around the open end of each bore, there is provided an impact absorbing ring 36.

The remaining patents uncovered from the search but not specifically discussed are merely cited to show generally the state of the art and are directed to wire or cable clamping devices.

None of the prior art uncovered in the search disclosed a cable clip for retaining coaxial cables against a mounting surface like that of the present invention which includes fastening retainer means for holding a fastening device in place relative to the clip prior to installation. This is accomplished in the present invention by the fastener retaining means which is formed of a plurality of segmented arcuate-shaped wall portions. Each of the wall portions is tapered inwardly so as to resiliently grip a fastener device.

OBJECTS OF THE INVENTION

Accordingly, it is a general object of the present invention to provide an improved cable clip for retaining coaxial cables and the like against a mounting surface which is relatively simple and economical to manufacture and assemble.

It is an object of the present invention to provide an improved cable clip for retaining coaxial cables and the like against a mounting surface which includes fastener retainer means for holding a fastening device in place relative to the clip prior to installation.

It is another object of the present invention to provide an improved cable clip for retaining coaxial cables and the like against a mounting surface which is of a construction so as to accommodate different sizes of cables.

SUMMARY OF THE INVENTION

In accordance with these aims and objectives, the present invention is concerned with the provision of a cable clip for retaining cables against a mounting surface which includes a housing member having an upper surface, and a lower surface disposed substantially parallel to the upper surface. A fastening hole extends between the upper surface and the lower surface. Fastener retaining means is formed within the fastener hole for retaining a fastener device in place prior to user installation. The fastener retaining means includes a plurality of segmented arcuate-shaped wall portions. Each of the wall portions is tapered inwardly towards the lower surface so as to resiliently grip the fastener device.

In another embodiment of the present invention, the fastener retaining means is formed of a plurality of radially extending tabs disposed on the interior surface of a cylindrically-shaped fastener hole. The plurality of tabs are adapted to frictionally engage with the fastener device with a retention fit.

BRIEF DESCRIPTION OF THE DRAWINGS

These and other objects and advantages of the present invention will become more fully apparent from the following detailed description when read in conjunction with the accompanying drawings, with like reference numerals indicating corresponding parts throughout, the several views and wherein:

FIG. 1 is a perspective view of a cable clip, embodying the principles of the present invention.

FIG. 2 is a top plan view, taken along the lines 2—2 of FIG. 3;

FIG. 3 is a side elevational view, taken along the lines 3—3 of FIG. 2;

FIG. 4 is a bottom plan view, taken along the lines 4—4 of FIG. 3;

FIG. 5 is an enlarged, cross-sectional view, taken along the lines 5—5 of FIG. 2;

FIG. 6 is a bottom perspective view of the cable clip;

FIG. 7 is a side view of the cable clip of the present invention with a screw pre-inserted therein;

FIG. 8 is a side elevational view of the cable clip of FIG. 1, illustrating its use in mounting a cable of a relatively small diameter to a mounting surface;

FIG. 9 is a side elevational view, similar to FIG. 8, but illustrating the mounting of a cable of a relatively larger diameter;

FIG. 10 is a top plan view of a second embodiment of a cable clip of the present invention;

FIG. 11 is a bottom plan view thereof; and

FIG. 12 is an enlarged, cross-sectional view, taken along the lines 12—12 of FIG. 11.

DESCRIPTION OF THE PREFERRED EMBODIMENTS

Referring now in detail to the drawings, there is shown in FIGS. 1 through 9 an improved cable clip 10 for retaining coaxial cables and the like against a mounting surface. The cable clip is comprised of a substantially rectangular-shaped housing member 12 which is formed of a plastic material such as polycarbonate by a conventional injection molding process. The housing member 12 has an upper surface 14 and a lower surface 16 which is parallel to the upper surface 14. The housing member also has a depth dimension 18 and a height dimension 20.

The upper surface 14 of the housing member 12 includes a fastener hole 22 for receiving a fastening device such as a screw 24 and the like. The hole 22 extends between the upper surface 14 and the lower surface 16 and is defined by a plurality of segmented arcuate-shaped wall portions 26 separated by elongated slots 28. At just below the mid-point along the height dimension 20, each of the wall portions 26 is tapered inwardly towards the lower surface 16, as shown in FIG. 5. The diameter of the hole 22 is somewhat smaller adjacent the lower surface 16 and larger at the upper surface 14.

As a result, the screw 24 can be rapidly inserted into and removed from the fastener hole 22 by merely pushing in on the screw head or pulling on the same. This eliminates the need of rotating of the screw which is a slow, time-consuming process. The manner of insertion and removal of the screw 24 can be performed a number of times without damaging the integrity of the fastening hole 22. Further, the plurality of segmented wall portions 26 defining fastener retaining means serve to provide a spring-like action for resiliently gripping or holding the screw in place relative to the cable clip prior to user installation. Thus, this also facilitates the shipping and storage of the cable clips with the screws pre-inserted therein when not in-use so as to prevent them from being lost.

In FIGS. 10 through 12, there is shown a second alternative embodiment of the cable clip 10a of the present invention. It will be noted that FIGS. 10–12 correspond closely to FIGS. 2, 4 and 5 of the first embodiment. The only differences reside in the fastener retaining means wherein they are now formed of three equally-spaced and radially extending projections or tabs 30 disposed on the lower part of the interior wall surface of the fastener hole 22a. As can be seen from FIG. 12, the hole 22a is defined by a cylindrically-shaped continuous wall 32 extending between the upper surface 14a and the lower surface 16a. The interior wall 32 is made of a continuous annular ring rather than being segmented and does include a taper. In use, the tabs are adapted to be frictionally engageable with the threads of the screw with a retention fit so as to retain the same in position prior to installation by the user.

Referring back to FIG. 3, in the lower surface 16 there is provided a tunnel-shaped cable receiving opening 34 which is formed with side walls 36 and 38. In order to accommodate different diameter-size cables, a pair of spaced-apart first and second ribs 40a and 40b are formed on the side wall 36 and a third rib 40c is disposed at the mid-point on the opposite side wall 38, as shown in FIGS. 4 and 6. The ribs 40a–40c define cable retention means which serve to contain two different types of coaxial cables, such as RG-59/U type and RG-6/U type without placing an excessive amount of pressure upon the jacketing or outer shielding of either type of cable. This is accomplished by forming each of the ribs with an upper region 42 and a lower region 44.

As illustrated in FIG. 7, a lower region 44 includes a wall surface 46 disposed at an angle $\alpha$ which is a relatively small number of degrees from being perpendicular to the mounting surface 48 so as to provide an angular lead-in. In a preferred embodiment, the angle $\alpha$ is approximately 8° so as to permit the easy placement of the cable within the opening 34. The upper surface 42 includes a wall surface 50 which is disposed relatively perpendicular to the mounting surface 48. As shown in FIG. 8, a cable clip is used for retaining a relatively small coaxial cable 53a (RG-59/U) as the screw 24 is inserted through the mounting surface 48 and into the wall support 52. It will be noted that the smaller cable 53a is held essentially within the opening 34 by the lower regions 44 of the ribs 40a through 40c in order to avoid excessive deformation or distortion of the cable 53.

In FIG. 9, the cable clip 10 is used for retaining a relatively large coaxial cable 53b (RG-6/U) as the screw 24 is inserted into the mounting surface 48. As will be appreciated, the larger cable 53b is held within the opening 34 by both the upper and lower regions 42 and 44 of the ribs 40a-40c. The lower regions 44 allow the opening 34 to accommodate the larger diameter size cables without causing any deformation on its lower side. The upper regions 42 are used to frictionally grip the smaller cables and prevents distortion on its top side caused by contact with the top inner surface of the tunnel-shaped opening 34.

It should be understood that the ribs 40a-40c are also provided on the second embodiment of the cable clip 10a shown in FIGS. 10 through 12. Therefore, the description of these ribs with respect to FIGS. 10-12 will not be repeated again.

In use, the cable installer takes the cable clip 10 or 10a which already has in place the screw 24 and places the cable 53a or 53b into the cable opening 34 in the cable clip 10 or 10a. Then, the lower surface 16 of the cable clip is positioned firmly against the mounting surface 48 and the pre-inserted screw 24 is threaded into the wall support 52 until its head is flush against the upper surface 14 of the clip.

From the foregoing detailed description, it can thus be seen that the present invention provides an improved cable clip for retaining coaxial cables and the like against a mounting surface which includes fastener retainer means for holding a fastening device in place relative to the clip prior to installation. In one embodiment, the fastener retainer means is formed of a plurality of segmented arcuate-shaped wall portions, each being tapered inwardly so as to resiliently grip the fastening device. In an alternate embodiment, the fastener retaining means is formed of a plurality of radially extending tabs disposed on the inner surface of a cylindrically-shaped fastening hole so as to frictionally engage the fastening device with a retention fit.

While there has been illustrated and described what are at present considered to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed as the best modes contemplated for carrying out the invention, but that the invention will include all embodiments falling within the scope of the appended claims.

What is claimed is:

1. A cable clip for retaining cables against a mounting surface, comprising:

a housing member having an upper surface, and a lower surface disposed substantially parallel to said upper surface;

a fastening hole extending through said housing member and between said upper surface and said lower surface;

cable receiving means formed within said lower surface of said housing member for accommodating cables of different size diameters; and fastener retaining means formed within said fastening hole for retaining a fastening device in place prior to installation of said fastening device within said mounting surface, and comprising an annular, tubular wall member axially slotted so as to define a plurality of segmented, arcuate-shaped wall portions for resiliently gripping said fastening device in a frictional mode such that said fastening device can be slidably inserted into and removed from said tubular wall member, without relative rotation with respect thereto, along axially smooth inner surface portions of said tubular wall portions.

2. A cable clip as claimed in claim 1, wherein said housing member is substantially rectangular in shape.

3. A cable clip as claimed in claim 1, wherein said housing member is formed of a plastic material.

4. A cable clip as claimed in claim 1, wherein said cable receiving means is comprised of a tunnel-shaped opening defined by a pair of side walls and a plurality of ribs being formed on said walls for retaining at least two different diameter sizes of cables.

5. The clip as set forth in claim 1, wherein:
said segmented wall portions are tapered inwardly towards said lower surface.

6. The clip as set forth in claim 4, wherein:
said tunnel-shaped opening has a longitudinal axis; and
said plurality of ribs are disposed substantially perpendicular to said longitudinal axis of said tunnel-shaped opening.

7. The clip as set forth in claim 4, wherein:
said plurality of ribs each comprises a lower region disposed at a predetermined angle with respect to said mounting surface, an upper region disposed substantially perpendicular to said mounting surface.

8. The clip as set forth in claim 7, wherein:
said lower region angle with respect to said mounting surface is approximately 82°.

9. The clip as set forth in claim 4, wherein:
said plurality of ribs comprises one rib disposed upon a first one of said side walls of said tunnel-shaped opening, and a pair of ribs disposed upon an opposite second one of said pair of side walls of said tunnel-shaped opening.

10. A cable clip for retaining cables against a mounting surface comprising:

a housing member having an upper surface and a lower surface disposed substantially parallel to said upper surface;

a fastening hole defined by a cylindrically-shaped continuous wall and extending between said upper surface and said lower surface;

fastener retaining means formed within said fastening hole for retaining a fastening device in place prior to user installation;

cable receiving means formed in said lower surface for accommodating cables of different size diameters without creating excessive distortions thereof; and said fastener retaining means including a plurality of tabs disposed on the interior surface of said cylindrically-shaped wall, said plurality of radially extending tabs being adapted for frictional engagement with said fastening device with a retention fit.

11. A cable clip as claimed in claim 10, wherein said housing member is substantially rectangular in shape.

12. A cable clip as claimed in claim 10, wherein said housing member is formed of a plastic material.

13. A cable clip as claimed in claim 10, wherein said cable receiving means is comprised of a tunnel-shaped opening defined by a pair of side walls and a plurality of ribs being formed on said side walls for retaining at least two different diameter sizes of cables.

14. The clip as set forth in claim 10, wherein:

said radially extending tabs are equiangularly disposed about said interior surface of said cylindrically-shaped wall and are disposed within the same radially extending plane.

15. The clip as set forth in claim 13, wherein:

said tunnel-shaped opening has a longitudinal axis; and said plurality of ribs are disposed substantially perpendicular to said longitudinal axis of said tunnel-shaped opening.

16. The clip as set forth in claim 13, wherein:

said plurality of ribs each comprises a lower region disposed at a predetermined angle with respect to said mounting surface, and an upper region disposed substantially perpendicular to said mounting surface.

17. The clip as set forth in claim 16, wherein:

said lower region angle with respect to said mounting surface is approximately 82°.

18. The clip as set forth in claim 13, wherein:

said plurality of ribs comprises one rib disposed upon a first one of said side walls of said tunnel-shaped opening, and a pair of ribs disposed upon an opposite second one of said pair of side walls of said tunnel-shaped opening.

19. A cable clip for retaining cables against a mounting surface comprising:

a housing member having an upper surface and a lower surface disposed substantially parallel to said upper surface;

a fastening hole extending between said upper surface and said lower surface;

fastener retaining means formed within said fastening hole for retaining a fastening device in place prior to user installation;

cable receiving means formed in said lower surface for accommodating cables of different size diameters without creating excessive distortions thereof;

said cable receiving means including a cable receiving opening defined by first and second side walls, a pair of spaced-apart first and second ribs disposed on said first side wall, and a third rib disposed on said second side wall between said first and second ribs; and each of said first through third ribs being formed of an upper region and a lower region, said lower region having a wall surface disposed at an angle which is a relatively small number of degrees from being perpendicular to the mounting surface, said upper region having a wall surface disposed relatively perpendicular to said mounting surface.

20. A cable clip as claimed in claim 19, wherein said housing member is substantially rectangular in shape.

21. A cable clip as claimed in claim 19, wherein said housing member is formed of a plastic material.

22. The clip as set forth in claim 19, wherein:

said relatively small number of degrees from being perpendicular to said mounting surface, defining the relative disposition of said lower region of each one of said ribs, is approximately 8°.

* * * * *